United States Patent [19]

Scott

[11] 3,811,867
[45] May 21, 1974

[54] PROCESS FOR THE RECOVERY OF TANTALUM AND NIOBIUM AND OTHER METALS FROM TIN SLAG

[76] Inventor: John J. Scott, 3052 Saint Andrew Ave., Niagara Falls, Ontario, Canada

[22] Filed: Oct. 16, 1972

[21] Appl. No.: 297,595

[52] U.S. Cl. ................................................. 75/24
[51] Int. Cl. .......................................... C22b 51/00
[58] Field of Search ........................ 75/24, 133.5, 1

[56] References Cited
UNITED STATES PATENTS

| | | | |
|---|---|---|---|
| 2,140,801 | 12/1938 | Leemans | 75/133.5 X |
| 2,131,350 | 9/1938 | Leemans | 75/133.5 X |
| 2,972,530 | 2/1961 | Zimmerley | 75/1 |
| 3,721,727 | 3/1973 | Gustison | 75/24 X |

OTHER PUBLICATIONS

Hunter, W. L. and Fusman, O. C. "Electric-Arc Furnace Reduction of Tin Slag for Production of Columbium-Tantalum-Burning Alloy" Bus. of Mines Report of Investigations 6734 (1966).

Primary Examiner—A. B. Curtis
Assistant Examiner—John F. Niebling
Attorney, Agent, or Firm—Arthur A. Loiselle, Jr.

[57] ABSTRACT

Aluminum oxide or calcium oxide is added to tin slag, which contains a relatively large silica content along with a source of carbon, and the mixture is fused. The added aluminum oxide or calcium oxide combines with the silicon oxide and other metallic compositions present to form a slag phase of a new composition which has a melting point 100°–400°C higher than the original slag composition. In the fusion the carbon reduces the tantalum and niobium and other oxides to the respective metals and the higher melting range of the new slag composition results in super heating of the metal alloy which facilitates a more effective ultimate separation of the metal alloy.

3 Claims, No Drawings

PROCESS FOR THE RECOVERY OF TANTALUM AND NIOBIUM AND OTHER METALS FROM TIN SLAG

BACKGROUND OF THE INVENTION

The invention relates to the ore smelting art. More particularly it relates to the arc furnace reduction of tin slag particularly for the ultimate production of tantalum and niobium, but equally effective for the extraction of other metals.

Tin slag has long been known as a source of the relatively scarce metals tantalum and niobium. Common sources for such tin slag are the Congo, Malaya, and Thailand.

Various techniques are known for the extraction of tantalum and niobium and other metals present from tin slags. For example, the process described in U.S. Pat. No. 2,131,350 wherein tantalum and niobium are removed from ores or metallurgical by-products like tin slag via a carbothermic reduction of the niobium and tantalum compounds in these materials. The impurities in the ores are selectively reduced and removed leaving a concentration of niobium and tantalum slag. The niobium and tantalum slag must then be further processed to reduce these to a mixed metal alloy, from which the metals niobium and tantalum per se are removed by additional processing. The main disadvantage of this approach is the extensive processing required which is economically impractical.

In another method described in U.S. Pat. No. 2,972,530 niobium and tantalum bearing ores or concentrates are directly smelted in an arc furnace. Iron is added to the ore or concentrate in order to form an alloy of niobium, tantalum, and iron which will be molten at the temperature of the melt. This facilitates separation of the niobium and tantalum bearing alloy, however, it presents the disadvantage of having an inordinately large amount of iron which must be removed.

A third approach is that described in the United States Department of Interior, Bureau of Mines, Report of Investigations No. 6734, "Electric-Arc Furnace Reduction of Tin Slag for Production of Columbium-Tantalum-Bearing Alloy," authored by W. L. Hunter and O. C. Fursman, 1966. Using the method described therein 90 percent of the columbium (niobium) and 85 percent of the tantalum contained in tin slag were recovered by an intermittently operative process for direct smelting in, for example, steel making furnaces. Char, metallurgical coal, wood chips, charcoal, and graphite were used as reducing agents in the main. Additions of silicon metal appeared to enhance the yield of tantalum and columbium (niobium) alloy therefore it was used as a reducing agent in conjunction with the carbon. Because the depleted slag was acidic in composition small amounts of lime were apparently added in one test to minimize slag attack on the basic furnace refractory. In general, the tin slag with carbon reductant was charged to the furnace, and successive batches of the mixture were fused and the temperature raised to 1,500° – 1,600° C holding the material in the furnace until reduction was complete, a tantalum-niobium alloy settled to the bottom of the furnace and the remainder of the molten depleted slag was removed from the furnace. The tantalum-niobium alloy remained deposited on the furnace hearth as a plastic mass as the unwanted slag was tapped and the alloy was ultimately physically removed, for example by raking, following the final slag tap. Despite the high yield of tantalum and niobium which is produced by this process it suffers from the serious shortcoming which results from the necessary intermittent operation of the furnace because of the necessity of raking the alloy from the bottom of the furnace which in turn results directly from the relatively low temperature of the bath which never gets hot enough to reduce the viscosity of the collected tantalum-niobium alloy to permit tapping thereof.

SUMMARY OF THE INVENTION

Not including the oxides or iron, tantalum, and niobium, tin slag is principally made up of calcium oxide, aluminum oxide, silicon oxide, with varying lesser amounts of titanium oxide, manganese oxide, magnesium oxide, tungsten oxide, and zirconium oxide depending on the geographical origin of the tin ore from which the bulk of the tin has been removed, which tin melting process produces the slag which forms the raw material for the present process. Thus the tin slag may be considered essentially as a calcium oxide-aluminum oxide-silicon oxide system. A study of the calcium oxide-aluminum oxide-silicon oxide phase diagram of E. F. Osburn and A. Muan (see "Phase Diagrams for Ceramists," published by the American Ceramic Society, 1964, page 219, FIG. 630) shows that the addition of either calcium oxide, or aluminum oxide, or mixtures of aluminum oxide and silicon oxide, or mixtures of calcium oxide and silicon oxide, or, mixtures of aluminum oxide and calcium oxide, greatly affects the melting point of the calcium oxide-aluminum oxide-silicon oxide system of the original tin slag, by increasing the melting point thereof, depending on how much of each material is added to the starting calcium oxide-aluminum oxide-silicon oxide mixture. From the same diagram it can be seen that if the silicon oxide content alone is increased, just the reverse occurs to the melting point, i.e., it is decreased.

The present invention is an improved method for extracting niobium and tantalum particularly from tin slag but the other metals present may also be more easily recovered if desired. The improvement results directly from the increase in melting point of the calcium oxide-aluminum oxide-silicon oxide phase of the slag which results preferably from the addition of either calcium oxide, aluminum oxide, or mixtures of these. The increase in melting point results in a hotter melt and wherein the separated niobium-tantalum alloy with other metals present, formed by the reduction reaction, is super heated. The super heating of the metal alloy in turn facilitates more effective settling of the alloy but of primary importance, decreases the viscosity of the melted alloy to a great enough degree that the alloy may be readily tapped from the furnace whereby a continuous extraction process results.

A sufficient amount of the aforementioned calcium oxide, aluminum oxide, silicon oxide combinations must be added to increase the melting point of the molten mass of the calcium oxide-aluminum oxide-silicon oxide phase of the tin slag at least approximately 100° C to make the reduced alloy flowable. As can be seen from the phase diagram such manipulations of the calcium oxide and aluminum oxide additions can produce as great an increase in the melting point of the calcium oxide-aluminum oxide-silicon oxide system of as much as 400° C. The specific quantity of calcium oxide or aluminum oxide which is to be added to the tin slag to generate a given increase in melting point, does of course depend on the composition of the particular tin slag being employed. In view of the present disclosure, it becomes an easy matter for one skilled in the art to select the proper amounts of calcium oxide, aluminum oxide, or a mixture of these additives once the chemical analysis of the tin slag is known. The calcium oxide-aluminum oxide-silicon oxide phase diagram mentioned above can be consulted to enable the operator to design a mixture which will melt at a temperature sufficiently high to reduce the viscosity of the molten alloy to a degree making it possible to tap the furnace and remove it in a fluid state.

DESCRIPTION OF THE PREFERRED EMBODIMENTS

In the preferred practice of the present invention, an addition of either relatively pure aluminum oxide or calcium oxide is most desirable but mixtures may be used. There are sources of these materials that are less than pure which are operable, for example, bauxite as a source of aluminum oxide, and limestone as a source of calcium oxide.

Furthermore, from the calcium oxide-aluminum oxide-silicon oxide phase diagram it can be seen that an increase in temperature of the calcium oxide-aluminum oxide-silicon oxide phase of the tin slag can be facilitated by mixtures of aluminum oxide and calcium oxide or even aluminum oxide combined with small amounts of silicon oxide as in bauxite. These are, however, less desirable than straight additions of aluminum oxide or calcium oxide.

The following are illustrative of the preferred practice of the invention and are in no way to be construed as limiting. In the examples a niobium-tantalum alloy button with small amounts of other metals present was formed. It should be understood however that instead of cooling the furnace, aluminum oxide or calcium oxide enriched slag could have been poured off and additional enriched tin slag added and fused, this being repeated until a substantial amount of molten alloy was generated at which point the feeding of slag to the furnace would be stopped and the niobium-tantalum tapped off. But the furnace need not be cooled and after tapping the metal phase the upgrading process can be continued indefinitely with periodic tapping of the liquid metal alloy phase.

EXAMPLE I

A mixture of 62.5 percent Thailand tin slag, 31.25 percent calcium oxide, 6.25 percent carbon was fed to an electric arc furnace operating at an average KWH of 51.8 for a period of .717 of an hour. The original tin slag had the following analysis:

| | |
|---|---|
| $Ta_2O_5$ | 10.69% |
| $Nb_2O_5$ | — |
| FeO | 6.68% ($Fe_2O_3$) |
| $SnO_2$ | — |
| $TiO_2$ | 10.99% |
| $SiO_2$ | 20.14% |
| $Al_2O_3$ | 12.99% |
| CaO | 16.10% |
| MgO | — |
| $WO_3$ | — |
| $ZrO_2$ | 3.21% |
| Rare Earth Oxides | — |

From this furnace 55 pounds of slag analyzing 17.5 percent $SiO_2$, 61.5% CaO, 21% $Al_2O_3$ was formed, ignoring the other metallic compounds present. The melting point of this newly formed slag, as calculated from the phase diagram, was approximately 1,750° C. Approximately 1/3 of the tantalum present in the slag was found in the metal alloy that was allowed to form into a metal button in the bottom of the furnace but which could have been tapped in its liquid phase if desired. This button analyzed:

Weight %

| |
|---|
| 46.75 Fe |
| 17.09 Ta |
| 5.5 Ti |
| 3.47 Carbon |
| .85 Si |
| .47 Al |

The percent of the other elements was not determined. Based on a phase diagram analysis of the principal metals in the button, the melting point of the mixture was below 1,500° C.

EXAMPLE II

A mixture of 58.8 percent Thailand tin slag (same as in Example I), 29.4% $Al_2O_3$, 5.9% $SiO_2$, 5.9 percent carbon was fed to an electric arc furnace operating at an average KWH of 51.5 for a period of 0.583 of an hour. The $CaO \cdot Al_2O_3 \cdot SiO_2$ phase of this slag and additives mixture was 15% $SiO_2$, 6% CaO and 79% $Al_2O_3$ the melting point of which is approximately 1,850° C as determined on the phase diagram. A metal button was allowed to form in the furnace, which contained approximately 43 percent of the tantalum originally present in the slag, and analyzed:

Weight %

| |
|---|
| 51.39 Fe |
| 9.4 Ta |
| 1.74 Ti |
| 1.74 Carbon |
| 1.39 Si |
| .27 Al |

The percentage of other elements was not determined. As in Example I a phase diagram analysis showed the melting point of the mixture to be below 1,500° C.

The resulting metal mixture may then be separated into its constituent metal by any of the known prior art methods. For example the metal mixture may be depleted of iron by leaching with hydrochloric acid and the tantalum and niobium separated from each other as described by May et al, in "Separation of Tantalum From Columbium by the Hydrofluoric Acid-Sulfuric Acid-Methyl Isobutyl Ketone System," Bureau of Mines Report of Investigation 5862, 1961.

It is further understood that the reducing reaction which takes place in the molten bath can be improved in terms of the efficiency thereof, by the addition of such metals such as aluminum or calcium. For example aluminum oxide rich in aluminum would enhance the reduction reaction if it was added as the aluminum oxide source discussed above.

What is claimed is:

1. A process for the recovery of tantalum and niobium and other metals from commercial tin slag by the reduction of the oxides of said metals, by fusion of the tin slag in the presence of a reducing agent, wherein the improvement comprises:

adding to said tin slag a sufficient amount of a material selected from the group consisting of aluminum oxide, calcium oxide, silicon oxide-aluminum oxide, silicon oxide-calcium oxide, and aluminum oxide-calcium oxide to produce a molten bath having principally a $CaO \cdot Al_2O_3 \cdot SiO_2$ phase that melts at a temperature 100° to 400° C greater than the $CaO \cdot Al_2O_3 \cdot SiO_2$ phase of said tin slag, said amount being determined by reference to a $CaO \cdot Al_2O_3 \cdot SiO_2$ phase diagram.

2. The process of claim 1 wherein said material is aluminum oxide and said amount thereof in the molten $CaO \cdot Al_2O_3 \cdot SiO_2$ phase of said tin slag being processed is from 45 to 85 percent by weight.

3. The process of claim 1 wherein said material is calcium oxide and said amount thereof in the molten $CaO \cdot Al_2O_3 \cdot SiO_2$ phase of said tin slag being processed is from 50 to 70 percent by weight.

* * * * *